United States Patent [19]
Majeske

[11] 3,794,368
[45] Feb. 26, 1974

[54] IMPLEMENTS FOR HOLDING AND TURNING COMESTIBLES

[76] Inventor: John Majeske, 2835 Garrett Rd., Drexel Hill, Pa. 19026

[22] Filed: May 3, 1972

[21] Appl. No.: 250,025

Related U.S. Application Data

[63] Continuation of Ser. No. 88,660, Nov. 12, 1970, abandoned.

[52] U.S. Cl. .................................................. 294/5
[51] Int. Cl. ........................................... A47g 21/00
[58] Field of Search ...... 294/1 R, 5, 26, 61; 30/137, 30/323, 340, 343; 81/3.1 A, 3.45, 3.48; 99/419; 145/50 B, 50 R, 53

[56] References Cited
UNITED STATES PATENTS

| | | | |
|---|---|---|---|
| 258,420 | 5/1882 | Hessel | 81/3.1 A |
| 1,801,653 | 4/1931 | Berry | 294/5 |
| 587,339 | 8/1897 | Stebbins | 294/5 |
| 886,510 | 5/1908 | Huguet | 294/5 |
| 2,881,816 | 4/1959 | Batt | 294/61 X |

Primary Examiner—Evon C. Blunk
Assistant Examiner—Johnny D. Cherry
Attorney, Agent, or Firm—Synnestvedt & Lechner

[57] ABSTRACT

There is disclosed an implement for holding and turning a comestible, such as an ear of corn, adapted to be manipulated by hand, having a ridged hand-grip member, from the inner end of which extends a rigid rod member, formed, progressively, with a sharp point, a tapered portion, and a screw portion, and, inboard of the screw portion, a shank which is interlocked with the handle member, but a portion of which shank is preferably exposed so as to extend into the core of the comestible when the implement is screwed home.

1 Claim, 3 Drawing Figures

PATENTED FEB 26 1974
3,794,368
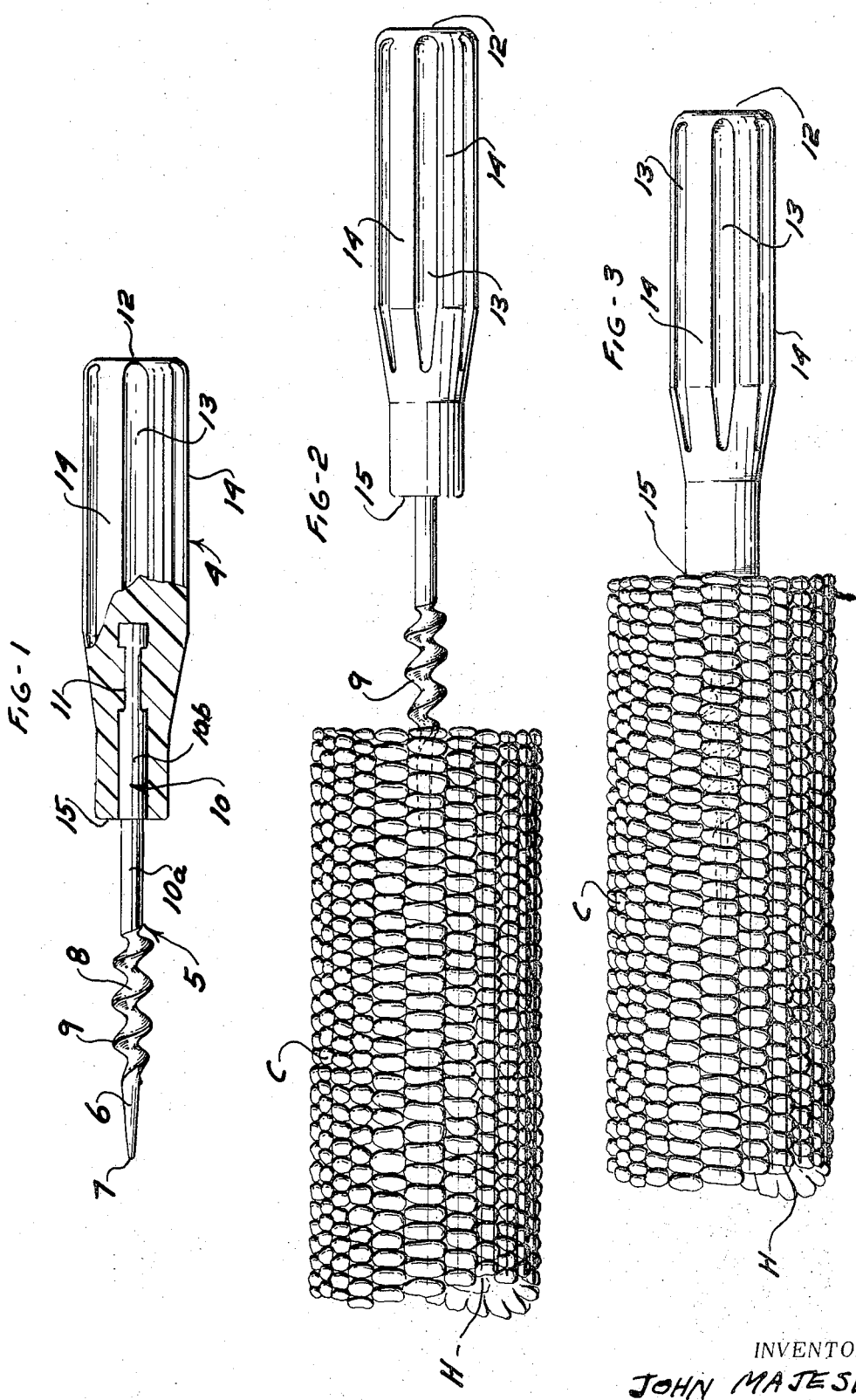
INVENTOR.
JOHN MAJESKE
BY Synnestvedt & Lechner
ATTORNEYS

IMPLEMENTS FOR HOLDING AND TURNING COMESTIBLES

This application is a continuation of application Ser. No. 88,660, filed Nov. 12, 1970, now abandoned.

This invention relates to implements for holding and turning comestibles, and, although adapted for a variety of purposes, it is particularly useful in the field of hand-held utensils.

The principal object of the invention is the improvement of such implements with respect to simplicity, manufacturing economy, sturdiness, adaptability, ease of use, and sureness of grip, both as to grip of the implement by the hand of the user and as to grip of the comestible by the implement itself.

More specifically, the invention contemplates the provision of an implement for holding and turning a comestible with a tough core, such as an ear of corn, wherein the principal object is accomplished by a special construction and configuration of handle member and associated rigid rod member, having cooperative features and functions, and notably by axially elongated, alined handle and rod members, whereof the latter has at least two elongated portions of differing characteristics, one such portion being tapered and terminating in a sharp point, and an adjacent portion, in alinement with the first, having a central stem surrounded with a steep-pitched sharp-edged screw of substantially constant diameter throughout most of the length of said portion; there being desirably a third elongated portion which is generally cylindrical and constitutes a shank in axial alinement with the second portion and the handle, all or part of which shank may be embedded in the handle and interlocked therewith; and in the preferred embodiment the handle member has an outer end surface of substantial area adapted to facilitate hand-pressing of the pointed and tapered portion of the rod into a core, and further has a ridged peripheral surface adapted to facilitate hand-turning of the implement and thus screwing of the second portion of the rod into the core.

The invention further contemplates a number of other objects, advantages, and features of construction and function, severally and in combination, which will appear from the following description of the present preferred embodiment, as illustrated in the accompanying drawings, wherein:

FIG. 1 is an elevational view, partly in longitudinal section, of an implement embodying the present invention;

FIG. 2 is an elevational view showing the implement in association with an ear of corn, into the central core of which the first portion of the rod of the implement has been forced; and FIG. 3 is a view similar to FIG. 2 but showing the relationship of the implement to the ear of corn after the rod has been screwed home into the core so that only the handle of the implement remains exposed.

As shown by the drawings the implement comprises, in general, an elongated handle member 4 (preferably of a molded plastic), and, in axial alinement therewith, a hard, elongated, rigid rod member 5 (preferably of stainless steel).

As best seen in FIG. 1, the rigid rod member 5 has an outermost elongated tapered portion 6 terminating in a point 7, and inboard of said portion 6, and axially alined therewith, a second elongated portion comprising a central stem 8 surrounded with a steep-pitched sharp-edged screw 9 of substantially constant diameter throughout most of the length of the second portion.

The rod, as so far described, is fixedly secured to the handle member 4, and this is desirably done by means of an elongated shank 10 of generally cylindrical shape connecting the said second portion and the handle and axially alined with both.

In the preferred embodiment the shank 10 includes an exposed cylindrical portion 10a inboard of the second portion of the rod, this portion and the first and second portions being respectively of about equal lengths, providing an elongated support for the comestible, at a minimum of cost, since a screw 9 of only a few turns is adequate for driving the implement home. The shank 10 also has an innermost part 10b embedded in the handle, and preferably interlocked therewith, for example by an adhesive bond, or else mechanically, as by one or more slots 11 routed or otherwise formed in or on the shank, so that the handle, molded thereon, or otherwise engaged therewith, is fixed as against relative rotation and preferably also as against relative axial dislodgment. If the handle member is mechanically interlocked with the shank, it may desirably be molded directly thereon. If it is adhesively secured to the shank, it may be molded separately, and drilled out to fit the cylindrical shank.

The handle itself has an outer end surface 12 of substantial area to facilitate pressing of the implement, by the hand of the user, for forcing the pointed and tapered end portion of the rod into the hard core of the ear of corn or the like; and also has grooves 13, forming ridges 14 or the like around the peripheral surface to facilitate turning of the implement, by the hand of the user, so that the second portion of the rod may be readily screwed into said core.

Still further the handle 4 has an inner end shoulder 15 which is adapted to abut against the comestible, when the implement is screwed in tightly, so that the comestible is firmly held by the cooperation of said shoulder and the several portions of the rod member.

As shown in FIG. 2 the implement (by means of surface 12) has been pressed into the core C of an ear of corn E until the screw-thread 9 is about to penetrate the same. While pressure at 12 is still applied, the ridged handle surface 13, 14, permits the user readily to screw the implement home, until the inboard shoulder of the handle member is tight against the core, as shown in FIG. 3.

Although a pair of the implements may be used, the combination of features as illustrated and described is such that one implement is generally adequate for holding, buttering, and manipulating the comestible, by one hand of the user.

The disclosure is intended as illustrative of the preferred embodiment of the invention, and not to be limited except by the claims, as given the broadest construction consistent with differentiation from the prior art.

I claim:

1. An implement, for holding and turning a comestible with a tough core, such as an ear of corn, comprising a one-piece, elongated, rigid plastic handle, and, in non-rotative co-axial relation thereto, a hard and rigid metallic rod member having three substantially-differing portions, the first being an elongated portion of circular section but tapering throughout and terminating in a sharp point at its outermost end, the second, which is inboard of said tapered portion and axially alined therewith, being an elongated portion which has a central stem surrounded with a steep-pitched sharp-edged screw of substantially constant diameter throughout most of the length of said second portion, said two portions being of about equal length, and the third, which is innermost, and axially alined with the first and second portions being an elongated uniform cylindrical portion, part of which is fixedly embedded in said handle, the said third portion having an exposed part, about equal in length to each of the first two portions, all three portions of the rigid rod member being of considerably less diameter than the handle in which the rod member is secured, for strength and ease of handling, whereby also the inner end of the handle may serve further as an abutment against the comestible.

* * * * *